United States Patent [19]
Hazama

[11] Patent Number: 6,023,313
[45] Date of Patent: *Feb. 8, 2000

[54] LIQUID CRYSTAL DISPLAY PANEL MANUFACTURING METHOD

[75] Inventor: Yoshikazu Hazama, Kanagawa, Japan

[73] Assignee: Sony Corporation, Tokyo, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/912,774

[22] Filed: Aug. 18, 1997

[30] Foreign Application Priority Data

Aug. 21, 1996 [JP] Japan .................................. 8-238456

[51] Int. Cl.⁷ ......................... G02F 1/1335; G02F 1/1333
[52] U.S. Cl. ............................................. 349/95; 349/158
[58] Field of Search ........................................ 349/95, 158

[56] References Cited

U.S. PATENT DOCUMENTS

| | | | |
|---|---|---|---|
| 5,164,853 | 11/1992 | Shimazaki | 349/158 |
| 5,278,685 | 1/1994 | Iwamoto et al. | 349/158 |
| 5,349,453 | 9/1994 | Munakata et al. | 349/95 |
| 5,629,787 | 5/1997 | Tsubota et al. | 349/158 |
| 5,657,129 | 8/1997 | Nishi | 356/401 |
| 5,674,650 | 10/1997 | Dirksen et al. | 430/22 |
| 5,691,794 | 11/1997 | Hoshi et al. | 349/158 |
| 5,691,836 | 11/1997 | Clark | 359/247 |
| 5,771,085 | 6/1998 | Ochi et al. | 349/158 |

*Primary Examiner*—William L. Sikes
*Assistant Examiner*—Tarifur R. Chowdhury
*Attorney, Agent, or Firm*—Hill & Simpson

[57] ABSTRACT

A liquid crystal display panel manufacturing method and an aligning apparatus for use in the method make it possible to precisely align an active matrix substrate and a counter substrate with high precision even if the two alignment marks thereon are substantially apart from each other. A clear image is formed by focusing a microscope onto an alignment mark on a counter substrate, captured into a video camera and output as a first image signal. The first image signal output from the video camera is temporarily stored in an image memory. Next, a clear image is formed by focusing the microscope onto an alignment mark on an active matrix substrate, captured into the video camera and output as a second image signal. The second image signal output from the video camera and the first image signal temporarily stored in the image memory are synthesized by an image synthesizing circuit, and then, displayed clearly on a monitor.

5 Claims, 3 Drawing Sheets

LIQUID CRYSTAL DISPLAY PANEL MANUFACTURING METHOD

BACKGROUND OF THE INVENTION

1. Field of the Invention

The present invention relates to a method of manufacturing a liquid crystal display panel composed of an active matrix substrate including a matrix of pixels and a counter substrate located opposed to the active matrix substrate at a required distance, and an aligning apparatus for use in manufacturing the liquid crystal display panel.

2. Description of the Related Art

As electronic equipment provided with a liquid crystal display apparatus, which is represented by a liquid crystal projector, has become widely available in recent years, the need for higher performance of the liquid crystal display apparatus has grown and improvements have been made to enhance the definition and brightness of the liquid crystal display apparatus. A liquid crystal display panel used in the liquid crystal display apparatus is generally composed of an active matrix substrate provided with a matrix of pixels, a TFT (Thin Film Transistor) for pixel control and the like, and a counter substrate provided with a color filter, a black matrix and the like. These substrates are overlaid (aligned) relative to alignment marks, laminated and integrated into one.

FIG. 4 shows a schematic structure of a conventional liquid crystal display panel in assembly. Referring to FIG. 4, a counter substrate 110A is located opposed and parallel to an active matrix substrate 110B, and an alignment mark a and an alignment mark b are formed on the counter substrate 110A and the active matrix substrate 110B, respectively. In laminating the active matrix substrate 110B and the counter substrate 110A in a conventional manner, the alignment marks a and b are simultaneously observed by a microscope 120, and the active matrix substrate 110B is shifted in a horizontal direction by an unillustrated shift table if the alignment marks a and b are displaced from each other, whereby the active matrix substrate 110B and the counter substrate 110A are aligned. A required distance d is provided between the active matrix substrate 110B and the counter substrate 110A because liquid crystal is required to be sealed therein in the later process. When the distance d is about several microns, since both the alignment marks a and b are within the focal depth of the microscope 120, sufficient visibility and precise alignment can be achieved.

However, in such a conventional method, if the distance between the active matrix substrate and the counter substrate increases to about several hundreds of microns, the two alignment marks are out of the focal depth of the microscope, which makes it difficult to simultaneously observe the two alignment marks with high visibility and also lowers alignment precision.

SUMMARY OF THE INVENTION

With such a problem in view, a first object of the present invention is to provide a liquid crystal display panel manufacturing method in which an active matrix substrate and a counter substrate are precisely aligned and laminated even if the two alignment marks thereon are substantially apart from each other.

A second object of the present invention is to provide an aligning apparatus capable of precisely aligning and laminating two substrates even if the two alignment marks thereon are substantially apart from each other, and, particularly, suitable for use in manufacturing a liquid crystal display panel.

According to one aspect of the invention, there is provided a liquid crystal display panel manufacturing method comprising the steps of preparing a first substrate with a display portion including a matrix of pixels and a first alignment mark, preparing a second substrate with a second alignment mark to be located opposed to the first substrate, separately displaying clear images of the first and second alignment marks on a display means, shifting the first and second substrates relatively so that the images of the first and second alignment marks displayed on the display means are overlaid at a reference position, and then laminating the first and second substrates while maintaining a required space therebetween.

In the liquid crystal display panel manufacturing method of the present invention, images of the first alignment mark on the counter substrate and the second alignment mark on the active matrix substrate are formed individually and displayed clearly on the display means.

It is preferable that an observation image obtained by focusing the first or second alignment mark be captured into a video camera and that the captured observation image be stored as an image signal and displayed on a monitor.

The second substrate may have a plurality of microlenses for gathering light onto the display portion formed on the first substrate.

Furthermore, the second substrate may have a transparent plate located over the microlenses.

It is preferable that the space between the first and second alignment marks be set so as to include the thickness of the microlenses, the thickness of the transparent plate and the height of a cavity to be filled with liquid crystal.

According to another aspect of the present invention, there is provided an aligning apparatus for aligning a first substrate with a first alignment mark and a second substrate with a second alignment mark serving as a reference for alignment of the second substrate with the first substrate while maintaining a required space between the substrates, which apparatus comprises an image forming means for selectively focusing the first alignment mark and the second alignment mark and forming clear images of the alignment marks, an image input means for capturing the images of the first alignment mark and the second alignment mark formed by the image forming means and converting the images into first and second image signals respectively, an image memory means for temporarily storing the first image signal of the first output alignment mark of the image signals output from the image input means, an image synthesizing means for synthesizing the first image signal stored in the image memory means and the second image signal of the alignment mark output later from the image input means, an image display means for simultaneously displaying the two images of the first alignment mark and the second alignment mark synthesized by the image synthesizing means, and a substrate shifting means for shifting the first and second substrates relatively so that the images of the first and second alignment marks displayed on the display means are overlaid at a reference position.

In the aligning apparatus of the present invention, the first alignment mark and the second alignment mark are focused selectively and clear images of the alignment marks are formed by the image forming means. The images of the first alignment mark and the second alignment mark formed by the image forming means are captured into the image input means and converted into image signals respectively therein.

The image signal of the alignment mark first output from the image input means is temporarily stored in the image memory means. The image signal stored in the image memory means and the image signal of the alignment mark output later from the image input means are synthesized and output by the image synthesizing means, and the images are displayed simultaneously and clearly on the image display means.

It is preferable that the first substrate be a matrix substrate with a display portion having a matrix of pixels and that the second substrate be a counter substrate provided with microlenses for gathering light onto the pixels.

The image forming means may include a microscope for forming an enlarged image of the alignment mark.

The image input means may include a video camera

It is preferable that the second substrate be a matrix substrate with a display portion having a matrix of pixels and that the first substrate be a counter substrate provided with microlenses for gathering light onto the pixels.

DESCRIPTION OF THE PREFERRED EMBODIMENT

An embodiment of the present invention will be described in detail below with reference to the drawings.

Figure 1:
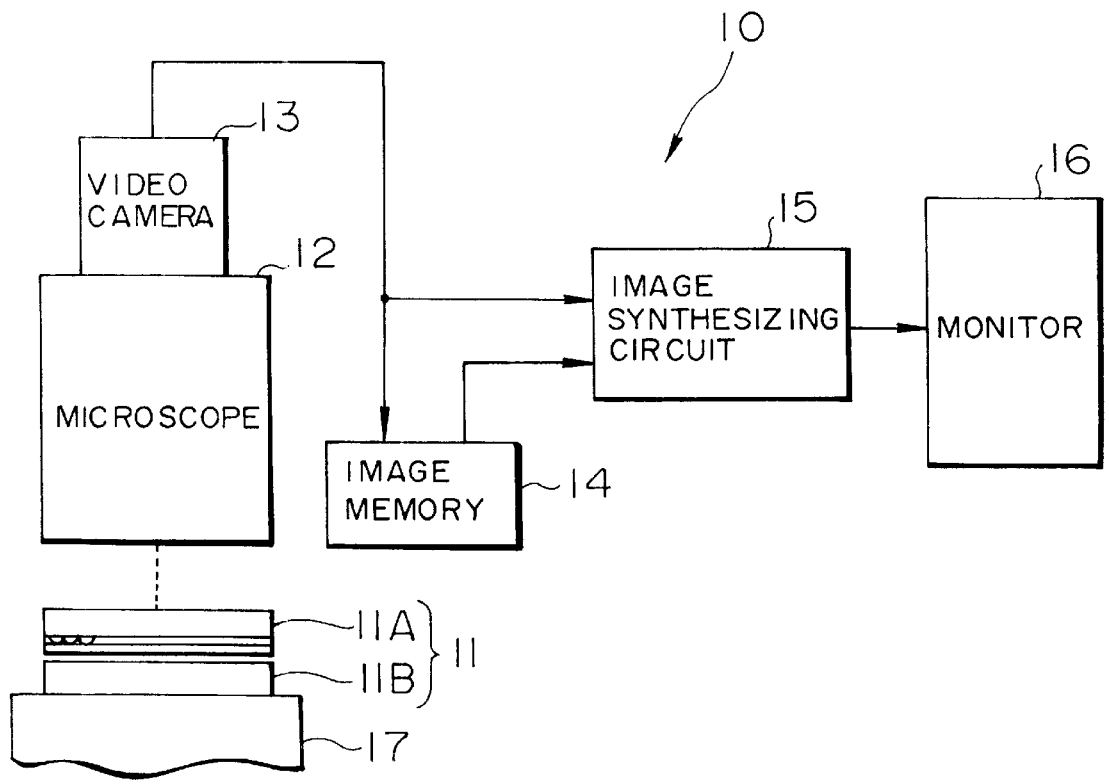
FIG. 1 is a block diagram showing the schematic structure of an aligning apparatus according to an embodiment of the present invention.

FIG. 1 shows a schematic structure of an aligning apparatus 10 according to an embodiment of the present invention. The aligning apparatus 10 comprises a microscope 12 serving as a clear image forming means for forming enlarged images of alignment marks A and B respectively formed on a counter substrate 11A and an active matrix substrate 11B which constitute a liquid crystal display panel 11, a video camera 13 serving as an image input means for capturing the images formed by the microscope 12 and outputting a first image signal corresponding to the alignment mark A on the counter substrate 11A and a second image signal corresponding to the alignment mark B on the active matrix substrate 11B, an image memory 14 serving as an image memory means for temporarily storing the first image signal of the image signals output from the video camera 13, an image synthesizing circuit 15 serving as an image synthesizing means for inputting the first image signal stored in the image memory 14 and the second image signal output from the video camera 13 and selecting and outputting these image signals alternately, a monitor 16 serving as a display means for simultaneously displaying the two image signals in response to the output from the image synthesizing circuit 15, and an X-Y-θ table 17 serving as a substrate shifting means for positioning the active matrix substrate 11B relative to the counter substrate 11A by slightly shifting the active matrix substrate 11B on the horizontal plane in two axial directions (X and Y) and the rotational direction (θ).

The first and second image signals output from the video camera 13 each include one field of information, and constitute one frame.

Figure 2:
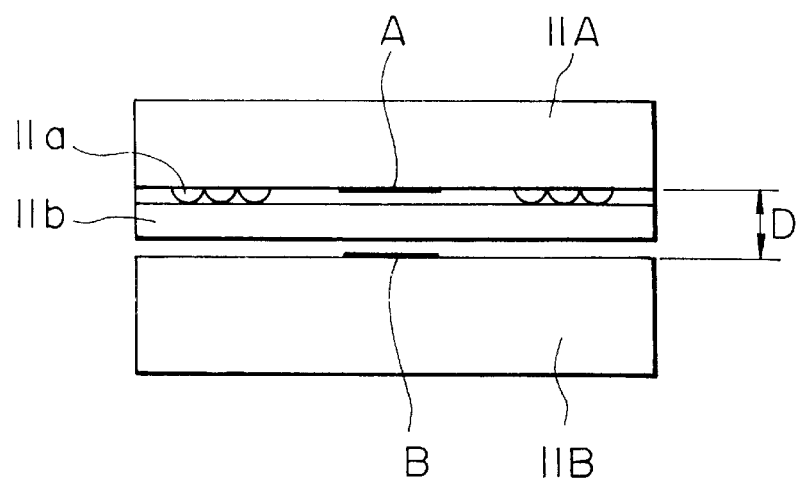
FIG. 2 is a view showing the relation between an active matrix substrate and a counter substrate in a liquid crystal display panel to be aligned.

FIG. 2 is an enlarged view of the counter substrate 11A and the active matrix substrate 11B, which constitute the liquid crystal display panel 11, before aligned. On the counter substrate 11A, a color filter, a black matrix and the like are formed, and a plurality of, for example, semicircular microlenses 11a are integrally formed thereon. These microlenses 11a are integrally formed on the counter substrate 11A for the following reason. That is, though it is necessary to increase the number of pixels according to the request for downsizing and high definition of the liquid crystal display panel, if the number of pixels is increased, the area of regions other than the pixels relatively increases, which increases the area of a black mask for covering these regions, decreases the pixel area contributory to image display, and lowers the aperture ratio of the liquid crystal display panel. The lowering of the aperture ratio darkens the display plane of the liquid crystal display panel, and reduces image quality. In order to prevent such reduction in image quality resulting from the lowering of the aperture ratio, the microlenses 11a are integrally formed on the counter substrate 11A to gather incident light onto pixels on the active matrix substrate 11B.

Figure 3A:
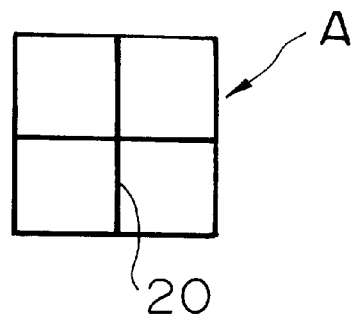
FIG. 3 is a view explaining a display state of two alignment marks on a monitor in the alignment apparatus shown in FIG. 1.

On the counter substrate 11A, for example, a square alignment mark A with a cross line 20 at the center thereof is formed as shown in an enlarged view of FIG. 3A. The alignment mark A is integrally formed, for example, in the same process as that of forming the microlenses 11a in order to simplify the manufacturing procedure. The microlenses 11a and the alignment mark A can be formed by, for example, selectively etching a parent material (glass substrate) of the counter substrate 11A. A cover glass plate 11b for evening a liquid crystal layer to be filled in a later process is laminated onto the microlenses 11a formed on the counter substrate 11A. The thickness of the cover glass plate 11b is determined by the refractive indices of the microlenses 11a and the counter substrate 11A, the pixel pitch of the liquid crystal display panel 11, and the like.

Figure 3B:
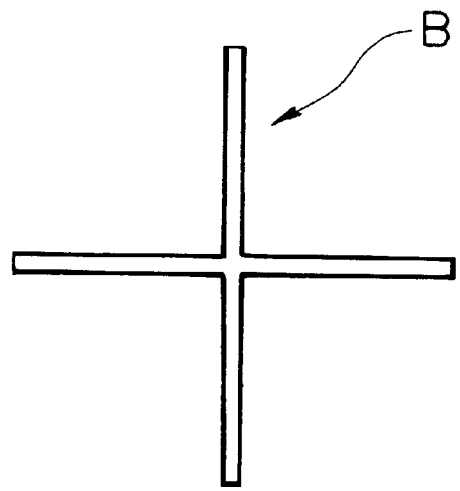

On the other hand, a matrix of pixels, a TFT (Thin Film Transistor) and the like are formed on the active matrix substrate 11B, and, for example, a cross-shaped alignment mark B is further formed on the surface of the active matrix substrate 11B as shown in an enlarged view of FIG. 3B. The active matrix substrate 11B may have what is called an on-chip black and on-chip color filter structure in which a black matrix and a color filter are formed as well as pixels and a switching device, such as a TFT, for pixel control.

In the liquid crystal display panel 11 used in this embodiment, a distance between the alignment mark A of the counter substrate 11A and the alignment mark B of the active matrix substrate 11B is longer than the conventional one by the thicknesses of the microlenses 11a and the cover glass plate 11b (several hundreds of microns). If the two alignment marks are thus apart from each other in the height direction thereof, they are out of the focal depth of the microscope as mentioned above and are made difficult to be simultaneously observed with high visibility, which lowers alignment precision. The aligning apparatus 10 according to this embodiment is used effectively in aligning the counter substrate 11A and the active matrix substrate 11B which are thus apart from each other by more than a predetermined distance in the height direction thereof.

The action of the aligning apparatus 10 will be described below with reference to FIGS. 1 to 3. First, a clear image shown in FIG. 3A is formed by focusing the microscope 12 onto the alignment mark A on the counter substrate 11A. The image of the alignment mark A is captured into the video camera 13, and output as a first image signal from the video camera 13. The first image signal output from the video camera 13 is temporarily stored in the image memory 14. Next, a clear image shown in FIG. 3B is formed in the similar manner to above by focusing the microscope 12 onto the alignment mark B on the active matrix substrate 11B. The image of the alignment mark B is captured into the video camera 13 and output as a second image signal from the video camera 13. The second image signal output from the video camera 13 is input to one input terminal of the image synthesizing circuit 15. At the same time, the first image signal temporarily stored in the image memory 14 is input to the other input terminal of the image synthesizing circuit 15. The image synthesizing circuit 15 alternately selects and outputs the first and second image signals to the monitor 16. Since the first and second image signals each have one field of information and constitute one frame, two images corresponding to the alignment marks A and B are simultaneously displayed on the monitor 16 as shown in FIG. 3C.

Figure 3C:
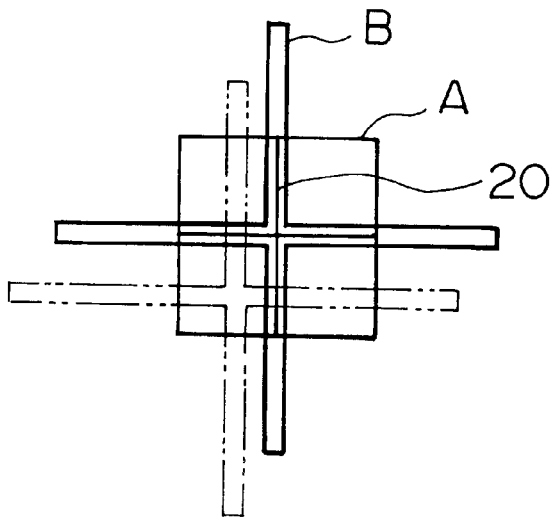
Figure 4:
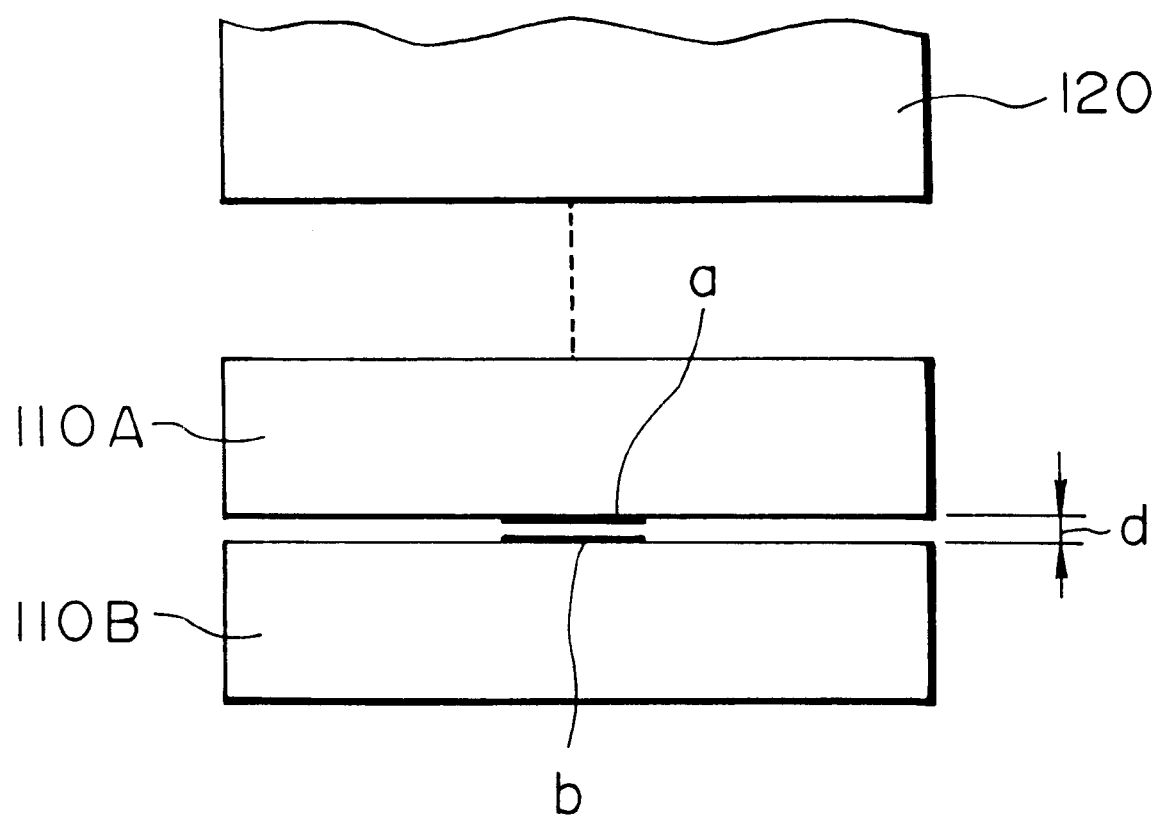
FIG. 4 is a view explaining a method of aligning an active matrix substrate and a counter substrate in a conventional liquid crystal display panel.

In this state, if the alignment mark A of the counter substrate 11A and the alignment mark B of the active matrix substrate 11B are not aligned with each other, for example, as shown by a two-dot chained line in FIG. 3C, the X-Y-θ table 17 is so driven that the two alignment marks are aligned, thereby shifting the active matrix substrate 11B in this embodiment. After the two alignment marks A and B are aligned on the monitor 16, a required pressure is applied between the counter substrate 11A and the active matrix substrate 11B by, for example, an unillustrated pressing device, and sealing agent previously applied to an unillustrated portion (peripheral portion) of one substrate is hardened. The process of aligning (laminating) the active matrix substrate 11B and the counter substrate 11A is thereby completed. After that, liquid crystal is injected into a space between the active matrix substrate 11B and the counter substrate 11A by an unillustrated liquid crystal filling device.

As mentioned above, in the aligning apparatus 10 according to this embodiment, when the alignment marks are observed by the microscope 12, the microscope 12 is focused onto the active matrix substrate 11A and the counter substrate 11B individually, and the image (alignment mark A) on the counter substrate 11A, which is focused first, is temporarily captured into the image memory 14 and simultaneously displayed on the monitor 16 in synchronization with the image (alignment mark B) of the active matrix substrate 11B which is focused later. Therefore, the images of the alignment marks A and B displayed on the monitor 16 are clear. In other words, in this embodiment, if the alignment marks A and B are substantially apart from each other in the height direction, the active matrix substrate 11B and the counter substrate 11A can be aligned with high precision. This increase in alignment precision makes it possible to sufficiently bring out the effect of gathering light onto the pixels on the active matrix substrate 11B by means of the microlenses 11a on the counter substrate 11A, and to thereby increase brightness.

While the present invention has been described above with reference to the preferred embodiment thereof, the present invention is not limited to the foregoing embodiment, and various modifications may be made therein. For example, though the image (the first alignment mark A) corresponding to (the first alignment mark A) output from the video camera 13 is captured into the image memory 14 in the above embodiment, the image (the second alignment mark B) corresponding to the active matrix substrate 11B may be captured into the image memory 14 on the contrary. In this case, the counter substrate 11A is shifted for alignment. Furthermore, though the images corresponding to the counter substrate 11A and the active matrix substrate 11B output from the video camera 13 are alternately selected by the image synthesizing circuit 15 and displayed on the monitor 16 as they are, these images may be displayed after subjected to arithmetic processing.

The shapes and positions of the alignment marks are not limited to those in the foregoing embodiment, but are arbitrary. Furthermore, though the object to be aligned is the liquid crystal display 11 composed of the counter substrate 11A integrally having the microlenses and the active matrix substrate 11B, the present invention is applicable to the devices, in general, composed of two substrates which are apart from each other to such an extent that they are not simultaneously within the focal depth.

As mentioned above, according to the liquid crystal display panel manufacturing method of the invention, clear images corresponding to the first alignment mark on the counter substrate and the second alignment mark on the active matrix substrate are separately formed, and thereby displayed clearly on the display means. As a result, alignment can be performed with high precision even if the distance between the first alignment mark on the counter substrate and the second alignment mark on the active matrix substrate is long.

Furthermore, the aligning apparatus of the present invention comprises an image forming means for individually focusing the first alignment mark on the first substrate and the second alignment mark on the second substrate and forming clear images of the alignment marks, an image input means for inputting the images of the first alignment mark and the second alignment mark formed by the clear image forming means and converting the images into image signals respectively, an image storing memory means for temporarily storing the first output image signal of the output alignment mark of the image signals output from the image input means, an image synthesizing means for synthesizing and outputting the image signal stored in the image memory means and the image signal of the alignment mark output later from the image input means, and an image display means for simultaneously displaying two images of the first alignment mark and the second alignment mark synthesized by the image synthesizing means. Consequently, precise alignment can be achieved even if the marks of the two substrates are positioned substantially apart from each other.

What is claimed is:

1. A method for assembling a liquid crystal panel display, comprising the steps of:

provided an imaging system having an image pick-up device with a variable focus and a display device on which images from said image pick-up device are displayed;

disposing a first substrate, having a display portion including a matrix of pixels and a first alignment mark, at an arbitrary distance from said image pick-up device;

disposing a second substrate, having a second alignment mark, between said image pick-up device and said first substrate at a respective arbitrary distance from said image pick-up device and said first substrate;

separately focusing said image pick-up device to a first focal length to obtain focused images of said first alignment mark and separately focusing said image pick-up device to a second focal length to obtain focused images of said second alignment mark;

simultaneously displaying said focused images of said first alignment mark and said focused images of said second alignment mark on said display device;

shifting at least one of said first substrate and said second substrate relatively so that at least a portion of said first alignment mark in at least one of said focused images of said first alignment mark coincides with at least a portion of said second alignment mark in at least one of said focused images of said second alignment mark; and laminating said first substrate and said second substrate together while maintaining a predetermined distance therebetween.

2. A method as claimed in claim 1 wherein said focused images of said first alignment mark comprise a first image set and wherein said focused images of said second alignment mark comprise a second image set, and wherein the step of simultaneously displaying said focused images of said first alignment mark and said focused images of said second alignment mark on said display device comprises:

storing one of said first image set and said second image set, as obtained by said image pick-up device, as a stored image set;

displaying the other of said first image set and said second image set in real time on said display device, combined with said stored image set.

3. A method as claimed in claim 1 wherein the step of disposing a second substrate between said image pick-up device and said first substrate comprises providing said second substrate with a plurality of microlenses for gathering light onto said pixels of said first substrate.

4. A method as claimed in claim 3 comprising the additional step of providing a transparent plate over said microlenses on said second substrate.

5. A method as claimed in claim 4 wherein the step of laminating said first substrate and said second substrate together includes filling a cavity, having a cavity height, between said first substrate and said second substrate with liquid crystal material, and wherein said first focal length differs from said second focal length by at least a thickness of said microlenses, a thickness of said transparent plate, and said cavity height.

* * * * *